United States Patent Office 3,510,624
Patented May 5, 1970

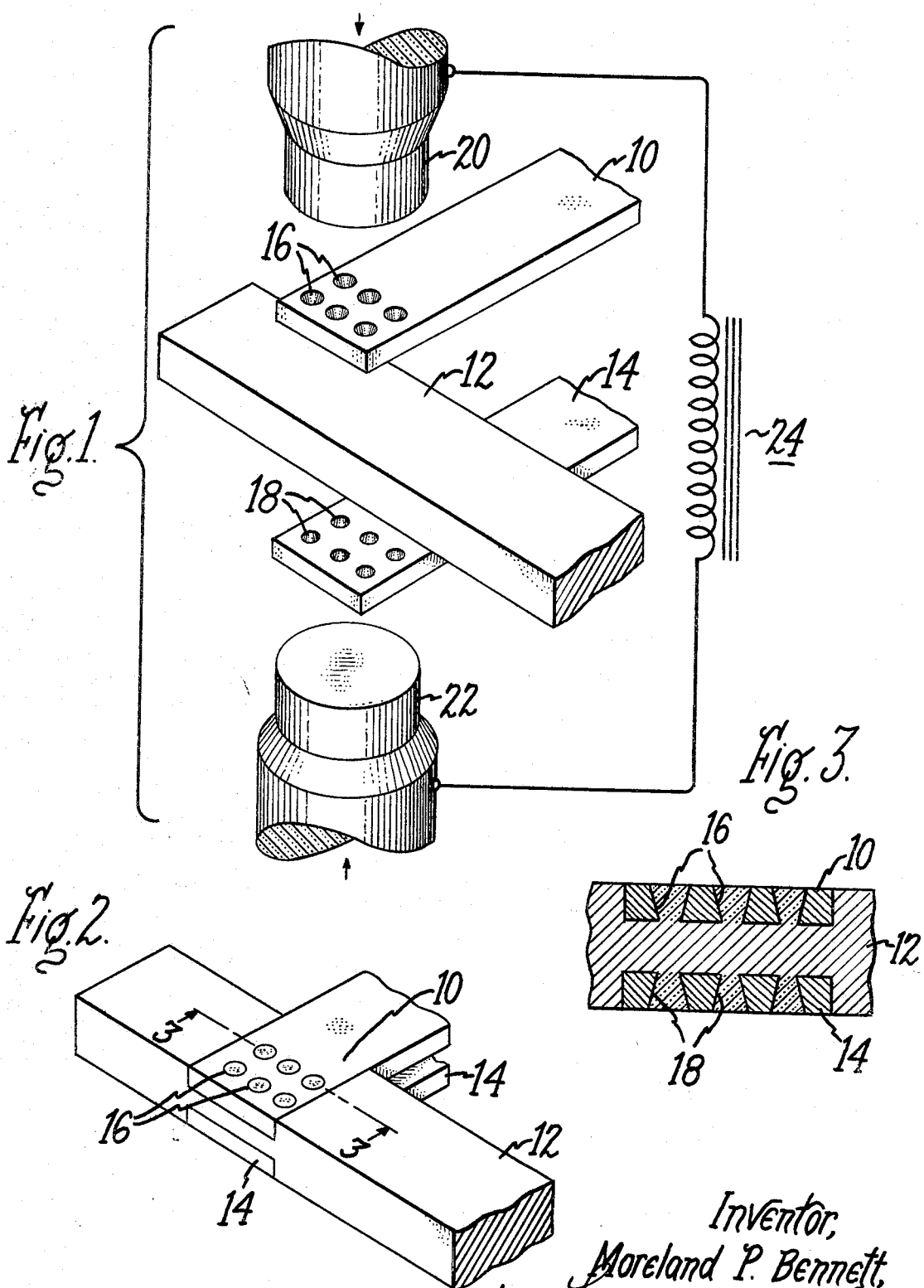

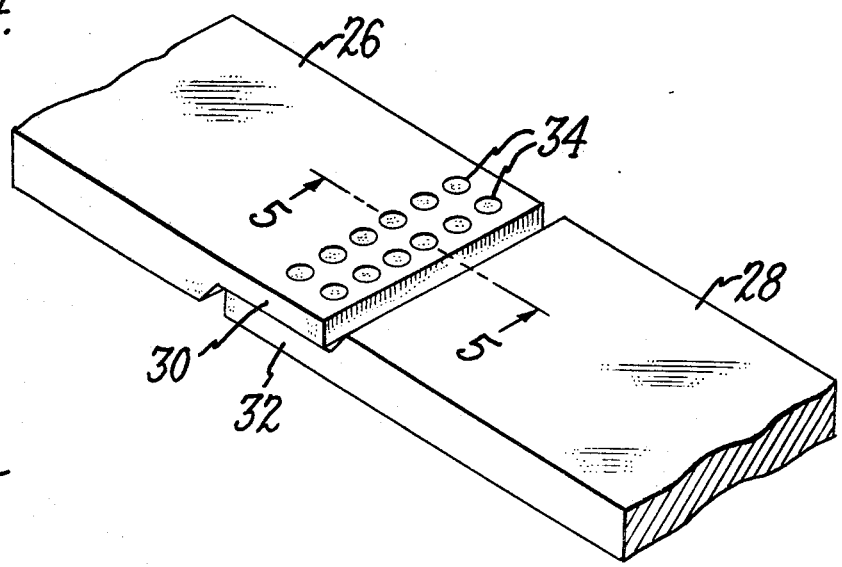
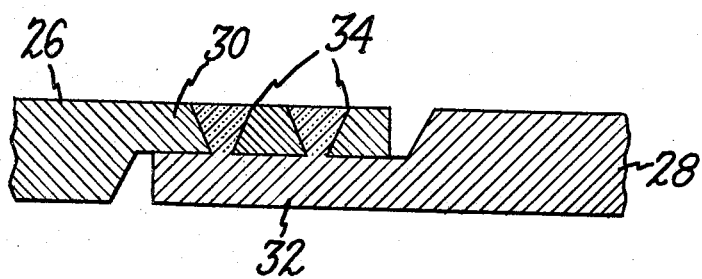
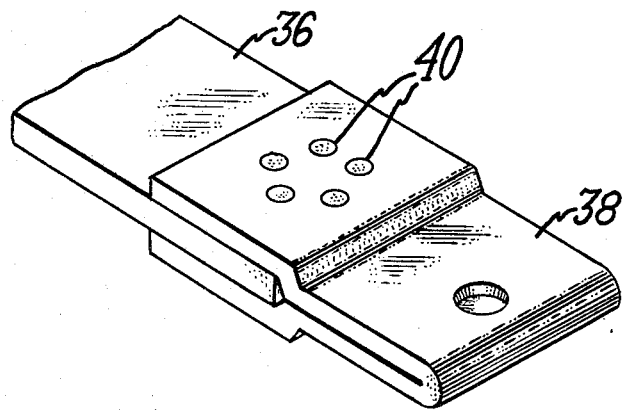

3,510,624
COMBINED MECHANICAL AND WELDED JOINT
AND METHOD OF MAKING
Moreland P. Bennett, Pittsfield, Mass., assignor to
General Electric Company, a corporation of New
York
Filed Jan. 10, 1968, Ser. No. 696,808
Int. Cl. B23k 9/28, 9/00
U.S. Cl. 219—91     5 Claims

ABSTRACT OF THE DISCLOSURE

A combined mechanical and welded joint between two or more overlapped strips of metal. Holes are placed in at least one of the strips of metal in the area to be joined and the parts are placed together in overlapping relation. Heat and pressure are applied so that the surface between the members are bonded or welded and the melted material flows into the holes of one or more of the members being joined, providing a secure mechanical and electrical connection.

Background

This invention relates to metal joints and, more particularly, to a combined mechanical and welded joint and the method of making such welded joint. The invention set forth finds special utility in the electrical industry.

It is often necessary in the electrical industry to join metal members with a secure mechancal or welded joint which has very low electrical resistance. These types of joints are frequently used in the electrical industry to connect leads or straps to electrical coils and similar devices. Often it is necessary to use such joints in order to connect the electrical lead of one coil to the electrical lead of another coil. In many instances, the various metal members are of varying thicknesses and sometimes are of dissimilar metal. For example, many electrical coils are wound from an aluminum strip or wire while the leads to such coil are usually made from copper. Of course, many coils are also made of copper wire or strips with copper leads secured thereto, while some coils are made of aluminum wire and have aluminum leads secured thereto. In all such types of coils, it is necessary that the joint between the lead and the wire or strip of the coil be mechanically strong and also be of very low electrical resistance.

It is well known to use either a welding or a brazing process for forming these desired joints. However, in many instances, the process is considered too expensive or time consuming and many times it does not lend itself to production line uses. Further, many of these known processes are not satisfactory for joining of dissimilar metal such as for example, a copper lead to an aluminum wire or strip. It has recently been discovered that by use of a hot extrusion welding technique, as is set forth herein, that either similar or dissimilar metal members may be joined to obtain a joint which is mechanically strong and of very low electrical resistance. Further, it has been found that the hot extrusion welding technique of this invention may be performed in a fairly rapid manner by use of welding electrodes, it is substantially a low cost joint and it may be performed in a production line fashion when used either to connect leads to coils or to connect different types of terminals to leads.

It is therefore one object of this invention to provide an improved mechanical and welded electrical joint.

A further object of this invention is to provide a novel joint between metal members wherein metal from one member is extruded through openings in at least one other member.

A still further object of this invention is to provide a novel method of making a joint between overlapped metal members.

Summary of invention

In carrying out this invention in one form, the metal members to be joined are assembled in overlapped relation and holes are provided in at least one of the metal members in the area to be joined. Heat and pressure are applied to the area to be joined by means of welding electrodes until the metal of one member flows through the holes in the other member forming a secure mechanical and welded joint therebetween.

The invention which is sought to be protected will be particularly pointed out and distinctly claimed in the claims appended hereto. However it is believed that this invention and the manner in which its various objects and advantages are obtained as well as other objects and advantages thereof will be more clearly understood from the following detailed description of a preferred embodiment thereof, especially when considered in the light of the accompanying drawings.

Brief description of drawings

FIG. 1 is an exploded perspective view of a preferred method of making the extrusion welded joint of this invention;

FIG. 2 is a perspective view of an extrusion welded joint formed by the method of FIG. 1;

FIG. 3 is an enlarged sectional view of the extrusion welded joint of FIG. 2, taken on the line 3—3 of FIG. 2;

FIG. 4 is a perspective view of a modified type of extrusion welded joint according to another form of this invention;

FIG. 5 is an enlarged sectional view on the line 5—5 of FIG. 4; and

FIG. 6 is a perspective view of a further modification of the extrusion welded joint of this invention.

Description of preferred embodiment

It has been discovered that a good, low resistance, high mechanical strength joint may be formed between similar or dissimilar metal members by use of the extrusion welding technique of this invention. The metal members to be joined are placed in overlapping relation and holes are formed in the overlapped portion of at least one of the overlapped members. Heat and pressure from welding electrodes are applied to the overlapped portion of the metal members causing the metal of one member to flow through the holes of the other member. The members are joined by a weldment along the surface of the overlapped area and are also securely connected by the metal extruded into the holes in one of the members. In the preferred form of the invention, the holes are conical or tapered with the largest diameter portion remote from the joint surface so that the extruded metal forms a mechanical lock in such conical hole.

Referring now to the drawings wherein like numerals are used to indicate like parts; FIG. 1 shows an exploded perspective view of the present preferred method of making th novel joint of this invention. As shown in FIG. 1, three metal members 10, 12 and 14 are placed in overlapped relation. A plurality of holes 16 are formed in the upper member 10 and a similar plurality of holes 18 are formed in the lower member 14. The assembled joint is placed between welding electrodes 20 and 22 which contact the opposite outer members 10 and 14 as indicated. The electrodes 20 and 22 are connected to a source of electrical energy, such as a transformer 24. When the electrodes 20 and 22 contact the members 10 and 14, a welding current flows through the assembled joint. Pressure is also applied to the assembled joint by electrodes 20 and 22 as is indicated by the arrows of FIG. 1. The combined heat and pressure of electrodes 20 and 22 on the assembled joint causes the metal members to weld together at the joining surface and also extrudes the metal of member 12 through the openings 16 and 18 in members 10 and 14. The joint is complete when the metal of member 12 is observed flowing beneath the contacting surfaces of electrodes 20 and 22.

FIGS. 2 and 3 show an extruded, welded joint formed by the method of FIG. 1 where the outer member 10 and 14 are copper and the inner member 12 is of aluminum. As is apparent from these figures, the aluminum 12 has flowed into the holes 16 and 18 of the copper members 10 and 14 completely filling these holes. It will also be noted that due to the pressure of electrodes 20 and 22, the copper members 10 and 14 have become imbedded in the aluminum member 12. FIG. 3 shows the holes 16 and 18 as being conical or tapered, thus providing a good mechanical locking joint between the members 10, 12 and 14. Thus, it will be apparent that in the joint of FIGS. 1, 2 and 3, that a surface weldment has been obtained between members 10 and 14 and the member 12, and also that the extruded metal portion from member 12 has flowed into the holes of members 10 and 14 providing a good electrical contact between these members and also forming a secure mechanical joint between these members.

In one form of this invention, a pair of .045" thick tin plated copper members were joined to three parallel strips of .155" x .543" aluminum wire using five .093" dia. tapered holes in the copper members for each of the parallel aluminum strips. The joint was made using air operated welding tongs with 1" x 2" x 2" carbon electrodes and an electrode force of approximately 600 lbs. Welding current of approximately 8,000 amperes was provided from a 40 kva. water-cooled transformer. The joint was complete when the aluminum was observed to flow from beneath the electrode faces. The resulting joint was similar to that shown in FIGS. 2 and 3. The completed joint was subjected to short circuit, thermal shock and resistance tests which proved very satisfactory. The resistance and temperature readings taken before and after the short circuit and thermal shock tests showed no significant change in the joint resistance. One sample of the joint was subjected to a shear test. The sample failed at a 680 lb. load with the failure occurring in the aluminum wire. There was no failure in the joint connecting the copper members to the aluminum wire. This particular test clearly showed that the joint formed by the extrusion welding method of this invention provides a very secure mechanical joint and one which is as strong as the metals comprising the joint and also a joint which has very good electrical characteristics.

FIGS. 4 and 5 show another embodiment of the invention wherein two metal members are joined by a hot extrusion welded joint. This type of joint is especially useful in joining two pieces of metal together for example two pieces of aluminum wire or aluminum strip or a piece of copper to a piece of aluminum. In the form shown in FIG. 4, a pair of strip or wire members 26 and 28 are joined in overlapped relation along the length of the strip. Member 26 is provided with a formed, machined or notched portion 30 on its lower side while member 28 has a formed, machined or notched portion 32 on its upper side. The notched portion 30 is provided with a plurality of holes 34. The notched portions 30 and 32 are placed in overlapped relation, as shown, such that essentially the strip or wire members 26 and 28 will form substantially a continuous member of substantially the same thickness throughout, as is particularly apparent from the cross-sectional view of FIG. 5. Heat and pressure are applied to the overlapped portion by welding electrodes. This causes the overlapped portions to weld along the mating surfaces and also extrudes the metal from portion 32 through the holes 34 in portion 30. This welding and extrusion can be more clearly seen in FIG. 5, which is a sectional view of the extruded welded joint taken on the line 5—5 of FIG. 4. As can be seen from FIG. 5, the holes 34 are conical in shape and provide a secure mechanical joint with the extruded metal from the portion 30. Of course, it will be apparent that the joint of FIGS. 4 and 5 could be made without forming or notching the joined portions. The portions of members 26 and 28 to be joined could be merely overlapped with the holes 34, as shown. The joint would clearly have a greater thickness than that shown.

In one form of the invention shown in FIGS. 4 and 5, a strip of .068 aluminum was joined to a similar strip of .068 aluminum. Two rows of 3/32 diameter holes were provided in one of the strips on ½ inch centers. A resistance brazing gun was used with 1 inch diameter carbon electrodes. The carbon electrodes covered four holes in each operation. A force of 500 pounds was applied to the joint and 4,200 amperes of current were applied. The joint was considered complete when the aluminum flowed from under the electrode faces.

FIG. 6 shows another embodiment in which a terminal member is secured to a lead by means of the extruded, welded joint of this invention. Referring now to FIG. 6, a lead member 36 is shown to which has been connected a terminal member 38 by means of a hot extrusion weld through a plurality of holes 40 formed in the terminal member 38. As will be understood, the lead member 36 may be aluminum while the terminal member 38 may be either copper or aluminum as is desired. As is apparent from FIG. 6, the metal from the lead 36 has been extruded into the holes 40 of the terminal 38 by the hot extrusion weld of this invention.

Where copper and aluminum are to be joined by the method of this invention, it has been found that the copper is preferably tin plated prior to the joining or making of the connection. It is also considered desirable to place the aluminum between the strips of copper to prevent undue melting of the aluminum during the welding step since, is will be well understood, the melting point of aluminum is substantially lower than the melting point of copper. Of course, it will be understood that silver plating may also be used if desired, however tin plating is preferred because of its lower cost. Also, as previously stated, it is desirable that the holes in one of the members be of a conical shape in order to form a locking mechanical connection between the extruded metal and the holes. However, as will be understood, bonding does occur between the extruded metal and the metal surrounding the holes and therefore it is not necessarily essential that the holes be of a conical shape. For example, many copper straps have been joined to aluminum rectangular wire without the use of conical or tapered holes.

While there has been shown and described the present preferred embodiment of this invention, together with modifications thereof, it will be clear that various changes may be made in the method and joint set forth by those skilled in the art. It will, or course, be apparent as mentioned above that more than one strip may be placed on each side of the joint if desired. Also, it will be readily understood that various types of metal may be joined, either similar or dissimilar metals. Obviously, these and other changes may be made without departing from the spirit and scope of the invention, particularly as it is set forth in the appended claims.

What is claimed as new and which it is desired to secure by Letters Patent of the United States is:

1. A method of securing metal members comprising the steps of:
  (a) assembling the metal members to be joined in overlapped relation;
  (b) forming holes in at least one of said overlapped members in the area of overlap;

(c) applying welding heat and pressure to the overlapped portions until the metal of one member flows into said holes in said at least one member.

2. A method of securing metal members as claimed in claim 1 in which a sandwich structure of three metal members is provided and holes are formed in both the top and bottom members of said sandwich structure.

3. A method of securing metal members as claimed in claim 2 in which the outer members of said sandwich structure are copper and the inner member is aluminum.

4. A method of securing metal members as claimed in claim 1 in which the holes formed in said at least one overlapped member are conical holes with the largest diameter of said holes being remote from the overlapping surface.

5. A welded joint comprising a plurality of metal members in overlapped relation with holes in at least one metal member, a surface weld between said plurality of metal members and melted metal of another of said plurality of metal members completely filling the holes in said at least one metal member.

References Cited

UNITED STATES PATENTS

| | | |
|---|---|---|
| 1,201,608 | 10/1916 | Mosler et al. |
| 1,231,290 | 6/1917 | Otte. |
| 1,812,151 | 6/1931 | Jacocks _____ 219—91 |
| 1,290,091 | 1/1919 | Cole _____ 219—127 |

JOSEPH V. TRUHE, Primary Examiner

L. H. BENDER, Assistant Examiner

U.S. Cl. X.R.

219—91, 107